(12) United States Patent
Tan (10) Patent No.: US 10,417,801 B2
(45) Date of Patent: Sep. 17, 2019

(54) IMAGE PROJECTION (71) Applicant: Hewlett-Packard Development Company, L.P., Houston, TX (US)

(72) Inventor: Kar-Han Tan, Sunnyvale, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/522,003

(22) PCT Filed: Nov. 13, 2014

(86) PCT No.: PCT/US2014/065465
§ 371 (c)(1),
(2) Date: Apr. 26, 2017

(87) PCT Pub. No.: WO2016/076874
PCT Pub. Date: May 19, 2016

(65) Prior Publication Data
US 2017/0316594 A1  Nov. 2, 2017

(51) Int. Cl.
*H04N 13/271* (2018.01)
*G06T 11/60* (2006.01)
*H04N 9/31* (2006.01)
*H04N 5/225* (2006.01)
*H04N 5/265* (2006.01)
(Continued)

(52) U.S. Cl.
CPC ............. *G06T 11/60* (2013.01); *G03B 17/54* (2013.01); *G06F 3/03547* (2013.01); *G06K 9/00375* (2013.01); *G06K 9/50* (2013.01); *H04N 5/2251* (2013.01); *H04N 5/265* (2013.01); *H04N 9/3179* (2013.01); *H04N 9/3194* (2013.01); *H04N 13/271* (2018.05); *G06F 3/017* (2013.01); *G06F 3/0425* (2013.01); *H04N 13/254* (2018.05); *H04N 2013/0092* (2013.01)

(58) Field of Classification Search
None
See application file for complete search history.

(56) References Cited

U.S. PATENT DOCUMENTS 4,986,651 A  1/1991  Vanderwerf
5,511,148 A  4/1996  Wellner
(Continued)

FOREIGN PATENT DOCUMENTS

CN  101292516  10/2008
CN  101810003  8/2010
(Continued)

OTHER PUBLICATIONS

Peter Ferschin et al., "Projected Time Travel: Architectural Heritage Projection in Situ," International Conference on Cultural Heritage and New Technologies, Vienna, 2012, pp. 1-9.
(Continued)

*Primary Examiner* — David H Chu
(74) *Attorney, Agent, or Firm* — HP Inc. Patent Department (57) ABSTRACT

According to one example for outputting image data, an image comprising a surface and an object are captured on a sensor. An object mask based on the captured image is created on a processor. A first composite image based on the object mask and a source content file is created. In an example, the first composite image is projected to the surface.

17 Claims, 8 Drawing Sheets

(51) Int. Cl.
*G03B 17/54* (2006.01)
*G06K 9/00* (2006.01)
*G06F 3/0354* (2013.01)
*G06K 9/50* (2006.01)
*G06F 3/042* (2006.01)
*H04N 13/00* (2018.01)
*H04N 13/254* (2018.01)
*G06F 3/01* (2006.01)

(56) References Cited

U.S. PATENT DOCUMENTS

| | | | |
|---|---|---|---|
| 6,067,112 | A | 5/2000 | Wellner |
| 6,431,711 | B1 | 8/2002 | Pinhanez |
| 6,840,627 | B2 | 1/2005 | Olbrich |
| 6,965,460 | B1 | 11/2005 | Gann et al. |
| 7,023,536 | B2 | 4/2006 | Zhang et al. |
| 7,038,846 | B2 | 5/2006 | Mandella et al. |
| 7,088,440 | B2 | 8/2006 | Buermann et al. |
| 7,161,664 | B2 | 1/2007 | Buermann et al. |
| 7,203,384 | B2 | 4/2007 | Carl et al. |
| 7,268,956 | B2 | 9/2007 | Mandella et al. |
| 7,432,917 | B2 | 10/2008 | Wilson et al. |
| 7,474,809 | B2 | 1/2009 | Carl et al. |
| 7,488,079 | B2 | 2/2009 | Hennes |
| 7,573,491 | B2 | 8/2009 | Hartkop et al. |
| 7,589,747 | B2 | 9/2009 | Matsui et al. |
| 7,599,561 | B2 | 10/2009 | Wilson et al. |
| 7,626,578 | B2 | 12/2009 | Wilson et al. |
| 7,710,391 | B2 | 5/2010 | Bell et al. |
| 7,729,515 | B2 | 6/2010 | Mandella et al. |
| 7,743,348 | B2 | 6/2010 | Robbins |
| 7,826,641 | B2 | 11/2010 | Mandella et al. |
| 7,843,470 | B2 | 11/2010 | Bannai et al. |
| 7,959,300 | B2 | 6/2011 | Hirahara et al. |
| 7,961,909 | B2 | 6/2011 | Mandella et al. |
| 8,121,640 | B2 | 2/2012 | Russ et al. |
| 8,126,580 | B2 | 2/2012 | El-Siblani et al. |
| 8,199,117 | B2* | 6/2012 | Izadi ............... G06F 17/30056 345/156 |
| 8,570,319 | B2 | 10/2013 | van Baar et al. |
| 8,619,179 | B2 | 12/2013 | Imai |
| 8,736,583 | B2 | 5/2014 | Anderson et al. |
| 9,069,382 | B1 | 6/2015 | Starner et al. |
| 2002/0186221 | A1 | 12/2002 | Bell |
| 2003/0035061 | A1 | 2/2003 | Iwaki et al. |
| 2003/0092470 | A1 | 5/2003 | Kurakane |
| 2004/0004626 | A1 | 1/2004 | Ida et al. |
| 2004/0095562 | A1 | 5/2004 | Moffatt |
| 2005/0078092 | A1 | 4/2005 | Clapper |
| 2005/0168437 | A1 | 8/2005 | Carl et al. |
| 2006/0010400 | A1 | 1/2006 | Dehlin et al. |
| 2006/0126128 | A1 | 6/2006 | Ahmed et al. |
| 2007/0008340 | A1 | 1/2007 | Endo et al. |
| 2008/0018591 | A1 | 1/2008 | Pittel et al. |
| 2008/0030461 | A1 | 2/2008 | Matsui et al. |
| 2008/0094588 | A1 | 4/2008 | James et al. |
| 2008/0192017 | A1 | 8/2008 | Hildebrandt et al. |
| 2009/0002342 | A1 | 1/2009 | Terada et al. |
| 2009/0027337 | A1 | 1/2009 | Hildreth |
| 2009/0115721 | A1 | 5/2009 | Aull et al. |
| 2009/0168027 | A1* | 7/2009 | Dunn ............... G03B 21/26 353/28 |
| 2009/0262098 | A1 | 10/2009 | Yamada |
| 2010/0017722 | A1 | 1/2010 | Cohen |
| 2010/0157388 | A1 | 6/2010 | Pishdadian et al. |
| 2010/0188474 | A1 | 7/2010 | Robinson et al. |
| 2010/0259633 | A1 | 10/2010 | Kii |
| 2010/0271394 | A1 | 10/2010 | Howard |
| 2010/0299103 | A1 | 11/2010 | Yoshikawa |
| 2010/0315825 | A1 | 12/2010 | Kawamura |
| 2011/0025650 | A1 | 2/2011 | Jocelyne |
| 2011/0063256 | A1 | 3/2011 | Ye et al. |
| 2011/0117532 | A1 | 5/2011 | Relyea et al. |
| 2011/0164191 | A1* | 7/2011 | Brown ............... G06K 9/50 348/744 |
| 2011/0169778 | A1 | 7/2011 | Nungester et al. |
| 2011/0227915 | A1 | 9/2011 | Mandella et al. |
| 2011/0234879 | A1 | 9/2011 | Kashitani |
| 2011/0242054 | A1 | 10/2011 | Tsu |
| 2011/0261260 | A1* | 10/2011 | Gruen ............... H04N 5/275 348/575 |
| 2012/0038549 | A1 | 2/2012 | Mandella et al. |
| 2012/0044421 | A1 | 2/2012 | Lin et al. |
| 2012/0054355 | A1 | 3/2012 | Arrasvuori et al. |
| 2012/0069180 | A1 | 3/2012 | Kawamura |
| 2012/0300080 | A1* | 11/2012 | Batson ............ H04N 21/23412 348/159 |
| 2012/0320157 | A1 | 12/2012 | Junuzovic et al. |
| 2013/0077236 | A1 | 3/2013 | Becze et al. |
| 2013/0113920 | A1 | 5/2013 | Blanton et al. |
| 2013/0194418 | A1 | 8/2013 | Gonzalez-Banos et al. |
| 2013/0194554 | A1* | 8/2013 | Aruga ............... G03B 21/147 353/69 |
| 2014/0118705 | A1 | 5/2014 | Hasegawa et al. |
| 2014/0139717 | A1 | 5/2014 | Short |
| 2014/0368615 | A1* | 12/2014 | van Baar ............ G06T 7/0075 348/48 |
| 2015/0042678 | A1 | 2/2015 | Alt et al. |

FOREIGN PATENT DOCUMENTS

| | | |
|---|---|---|
| CN | 102693005 | 9/2012 |
| CN | 103999025 | 8/2014 |
| JP | 10222436 | 8/1998 |
| JP | 2003-131319 | 5/2003 |
| JP | 2004192623 | 7/2004 |
| JP | 2006189712 | 7/2006 |
| JP | 2011081556 | 4/2011 |
| JP | 2005-266471 A | 9/2015 |
| KR | 1020110003705 | 1/2011 |
| TW | 200402989 A | 2/2004 |
| WO | WO2007/006051 | 10/2008 |
| WO | WO2009018161 | 2/2009 |
| WO | WO2010137496 | 12/2010 |

OTHER PUBLICATIONS

Shahram Izadi et al., "C-Slate: A Multi-Touch and Object Recognition System for Remote Collaboration using Horizontal Surfaces," 2007, pp. 3-10, IEEE.

Anton Fuhrmann et al.; "Computers and Graphics, Augmented Reality"; "Occlusion in collaborative augmente environments"; Vienna Austria; (1999), vol. 23, pp. 809-819.

Hartmann, Bjorn et al., "Augmenting Interactive Tables with Mice & Keyboards," UIST'09, Oct. 4-7, 2009, Victoria, British Columbia, Canada, pp. 149-152, ACM.

Kurz, Daniel et al., "Mutual Occlusions on Table-top Displays in Mixed Reality Applications,"; VRST '88, 1988, pp. 1-4, New York, New York, USA.

Extended European Search Report dated Apr. 23, 2015; EP Application No. 11870359.4; PCT/US2011/045983, 6 pp.

Gao, Rui et al; "Microsoft Research—Mobile Surface"; Microsoft Research; 2010; http://research.microsoft.com/en-us/projects/mobilesurface/; 1 page.

Hand, Randall: "Infinite Z Launches zSpace Virtual Holographic 3D Display for Designers": VizWorld.com; Dec. 13, 2011; pp. 2-3 of 9 http://www.vizworld.com/2011/12/infinite-launches-zspace-virtual-holographic-3d-display-designers/#sthash.j6Ys61PX.dpbs.

Harrison, Beverly & Ziola, Ryder; "Bringing Toys to Life: Intel Labs OASIS Project, Augmented Engineering"; Jan. 26, 2011; p. 1 of 2; http://augmentedengineering.wordpress.com/2011/01/26/bringing-toys-to-life-intel-labs-oasis-project/.

Harrison, Chris et al: "OmniTouch: Wearable Multitouch Interaction Everywhere"; UIST'11; Oct. 16, 2011; Santa Barbara, California; 10 pp. http://research.microsoft.com/en-us/um/people/awilson/publications/HarrisonUIST2011/HarrisonUIST2011.html.

Hartmann, Bjorn et al; "Pictionaire: Supporting Collaborative Design Work by Integrating Physical and Digital Artifacts": CSCW 2010;

(56) References Cited

OTHER PUBLICATIONS

Feb. 6, 2010; Savannah, Georgia; 4 pp.; http://research.microsoft.com/en-us/um/people/awilson/publications/HartmannCSCW2010/HartmannCSCW2010.html.

Hinckley, Ken et al; "Pen + Touch = New Tools"; UIST'10; Oct. 3, 2010; New York, New York; 10 pp. http://research.microsoft.com/en-us/um/people/awilson/publications/HinckleyUIST2010/HinckleyUIST2010.html.

Kane. Shaun K. et al; "Bonfire: A Nomadic System for Hybrid Laptop-Tabletop Interaction"; UIST'09; Oct. 4, 2009; Victoria, British Columbia, Canada; pp. 129-138; http://dub.washington.edu/dja.

Linder, Natan et al: "LuminAR: Portable Robotic Augmented Reality Interface Design and Prototype": UIST'10, Oct. 3, 2010; New York, New York; pp. 305-396; http://fluid.media.mit.edu/sites/default/files/2010-10-03-luminar_uist10_demo.pdf.

Melanson, Donald; "Microsoft Research Working on Portable Surface"; Mar. 2, 2010; 2 pp.; http://www.engadget.com/2010/03/02/microsoft-research-working-on-portable-surface/.

Melanson, Donald; "Wiimote Repurposed for Multi-Point Interactive Whiteboard"; Dec. 10, 2007; 2 pp.; http://www.engadget.com/2007/12/10/wiimote-repurposed-for-multi-point-interactive-whi.

Michael Wooldridge, "Teach Yourself Visually Adobe Photoshop CS4: Chapter 8: Working with Layers"; 2009, pp. 168-199, Wiley Publishing Inc.

PCT Search Report/Written Opinion dated Aug. 28, 2015; Application No. PCT/US2014/065465 filed Nov. 13, 2014; 11 pp.

Ramesh Raskar et al., "The Office of the Future: A Unified Approach to Image-Based Modeling and Spatially Immersive Displays"; SIGGRAPH '98, Jul. 19-24, 1998, Orlando, Florida, 10 pp.

Sasa Junuzovic et al.; Microsoft Research, "IllumiShare"; 2012, pp. 1-2, http://research.microsoft.com/en-us/projects/illumishare/default.aspx.

Scott R. Klemmer et al., "Integrating Physical and Digital Interactions on Walls for Fluid Design Collaboration," Human-Computer Interaction; Apr. 1, 2008, vol. 23. 77 pp. (138-213).

Simonite, Tom; "A Kitchen Countertop With a Brain"; MIT Technology Review; Jul. 2, 2010; 2 pp.; http://www.technologyreview.com/news/419639/a-kitchen-countertop-with-a-brain/.

Tyler Denis, "Superimpose a Car onto Another Image in Photoshop"; Design Instruct; Jun. 10, 2011, pp. 1-28, http://designinstruct.com/digitial-art/photo-manipulation/superimpose-a-car-onto-another-image-in-photoshop/.

Wilson, Andrew D. et al; "Combining Multiple Depth Cameras and Projectors for Interactions on, Above, and Between Surfaces"; UIST'10; Oct. 3, 2010; New York, New York; 10 pp.

Yuanyuan Ding et al; Catadioptric Projectors; 2009 IEEE Conference on Computer Vision and Pattern Recognition; Miami, FL.; 2009; http://www.eecis.udel.edu/~jya/lab_research/09/cprojector.pdf; 8 pp.

Office Action for U.S. Appl. No. 14/126,352, filed Dec. 12, 2013, dated Mar. 22, 2018; 26 pp.

Office Action for U.S. Appl. No. 14/126,352, filed Dec. 13, 2013, dated Apr. 10, 2015; 32 pp.

Final Office Action for U.S. Appl. No. 14/126,352, filed Dec. 13, 2013, dated Aug. 14, 2015; 31 pp.

International Search Report and Writen Opinion dated Feb. 20, 2012 for PCT/US2011/045983, filed Jul. 29, 2011; 9 pp.

Hartmann, Bjorn et al.;"Pictionaire Supporting Collaborative Design Work by Integrating Physical and Digitial Artifacts"; CSCW 2010; Feb. 6, 2010, Savannah Georgia; 4 pp.

Wilson, Andrew D.; Microsoft Research; "Using a Depth Camera as a Touch Sensor"; ITS 2010; Devices & Algorithms; Nov. 7, 2010; Saarbrucken, Germany; pp. 69-72.

\* cited by examiner

IMAGE PROJECTION

BACKGROUND

Two-dimensional and three-dimensional scanning technology allows for the digital capture or acquisition of the shape, contours, and other features of a physical object. For example, in a three-dimensional scanning application, various hardware and software may be used to capture an object such as a user's hand to display the object on a device or monitor.

DETAILED DESCRIPTION

In a computing system, a projector may be employed as both a display source and an illumination source. For example, a projector may project text, documents, images, video, or other digital media onto a surface and also illuminate an object, e.g., a hand, on or near the surface. In the case where the object is to be captured by, e.g., a camera, 3D sensor, infrared sensor, or other sensor, the object may have text or images superimposed on it, preventing a clean capture of the object by the sensor. In such cases, the projector does not optimally serve the dual purposes of a display source and an illumination source when digitally capturing an object.

As one example, in the case of a digital presentation or digital slide projected onto a surface where a user's hand is present or hovering between the projector and the surface, a digital capture of the hand would capture the slide and the hand, including the slide superimposed on the hand. In such examples, aside from preventing a clean capture of the hand, the projector already has a digital image of the slide it is projecting and may not need to capture it using a 3D sensor.

According to one example for outputting image data, an image comprising a surface and an object are captured on a sensor. An object mask based on the captured image is created on a processor. A first composite image based on the object mask and a source content file is created. In an example, the first composite image is projected to the surface.

Figure 1:
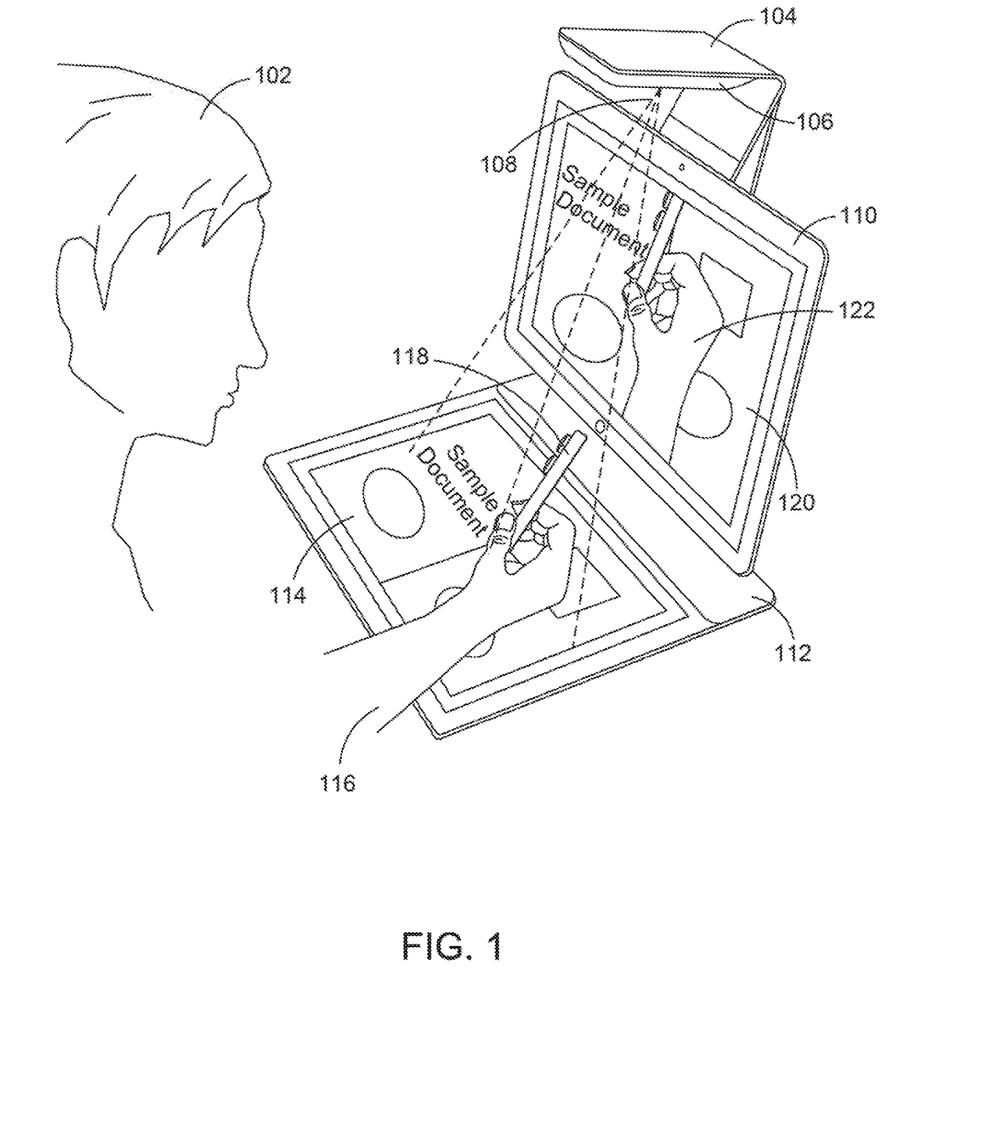
FIG. 1 is a perspective view of a device outputting content and an object, e.g., a user hand, in a first position, according to an example of the present disclosure.

FIG. 1 is a perspective view of a device outputting content and an object, e.g., a user hand, in a first position, according to an example of the present disclosure. In an example, FIG. 1 illustrates a computer system or device 100 ("device") utilized by at least one user 102. As discussed below in more detail, device 100 may comprise a sensor cluster 104, one or more sensors ("sensors") 106, a projector (or projector and mirror system) 108 (hereinafter "projector"), a display 110, and a mat 112. In some examples, mat 112 may be touch-sensitive.

In some examples, mat 112 and display 110 may display source content 114 and 120. In one example, the source content may be a digital presentation slide stored on or accessible by device 100. Source content 114 may be projected by the projector 108, which may be cantilevered over mat 112, while source content 120 may be displayed on display 110.

Device 100 may be used to capture or scan an object such as the hand 116 of user 102 within the field of view of a sensor 106, including a device in a user's hand such as a stylus 118 (referred to collectively herein as "object 116"). In some examples, a real-time representation 122 of the object 116 being captured or scanned may be displayed on display 110 as, e.g., part of source content 120 or overlaid on source content 120.

Device 100 in general may comprise any suitable computing device such as a desktop computer, laptop computer, notebook, netbook, all-in-one computer, tablet, or smartphone capable of interfacing with at least one sensor. In some examples, the housing of display 110 may comprise a processor, memory, and/or storage for use in device 100.

Display 110 may also be supported by a support structure (not shown), which may include a base and an upright member. The support structure may support the weight of display 110, as well as sensor cluster 104 and sensors 106, which may be cantilevered such that sensors 106 hover over mat 112. In the example shown in FIG. 1, the front end of the support base includes a portion creating a space or clearance under display 110 such that mat 112 may be received within the space formed under display 110.

In examples where mat 112 is touch-sensitive, mat 112 may comprise any suitable touch-sensitive technology for detecting and tracking one or multiple touch inputs by a user in order to allow the user to interact with software being executed by device 100 or some other computing device (not shown). For example, in some examples, mat 112 may utilize known touch sensitive technologies such as, for example, resistive, capacitive, acoustic wave, infrared, strain gauge, optical, acoustic pulse recognition, or some combination thereof.

In some examples, mat 112 and display 110, and/or a processor, memory, and storage of device 100, are electrically coupled to one another such that user inputs received by mat 112 are communicated to display 110 and/or the processor, memory, and storage housed in display 110 or external to display 110. Any suitable wireless or wired electrical coupling or connection may be used between mat 112 and display 110, or generally within device 100.

Sensor cluster 104 may comprise one or more sensors 106 and/or one or more illumination sources, such as a projector 108. Projector 108 may comprise any suitable digital light projector assembly for receiving data from a computing device and projecting an image or images that correspond with that input data. In some examples, projector 108 comprises a digital light processing (DLP) projector or a liquid crystal on silicon (LCoS) projector which are advantageously compact and power efficient projection engines capable of multiple display resolutions and sizes. Projector 108 may be electrically coupled to device 100 in order to receive data therefrom for producing light and images during operation such as through an electric conductor, WI-FI, BLUETOOTH®, NFC, an optical connection, an ultrasonic connection, or some combination thereof.

In some examples, sensor cluster 104 may also comprise a folding mirror, which may be a highly reflective surface disposed along a bottom surface of sensor cluster 104 and/or positioned to reflect images and/or light projected from projector 108 toward mat 112. The mirror may be a standard front surface vacuum metalized aluminum coated glass mirror. In other examples, the mirror may have a complex aspherical curvature to act as a reflective lens element to provide additional focusing power or optical correction. The mirror may allow projector 108 to be located off of the sensor cluster 104, with light reflected from the projector 108 onto the mirror of sensor cluster 104, such that illumination will appear to user 102 to be coming from the sensor cluster 104.

Sensors too may include a plurality of sensors and/or cameras to measure and/or detect various parameters. For example, sensors 106 may comprise at least one of a camera, an ambient light sensor, a depth sensor, and a three-dimensional (3D) user interface sensor.

More specifically, in an example, a camera 106 may be a high-resolution camera, a low-resolution camera, an infrared ("IR") camera, or other camera type. Camera 106 may be arranged to capture a still image or a video of an object or other items disposed on mat 112 or generally below sensors 106, including projected content.

In an example, an ambient light sensor 106 may be arranged to measure the intensity of light of the environment surrounding device 100, in order to, in some examples, adjust exposure settings of another sensor in sensor cluster 104, and/or adjust the intensity of the light emitted from other sources throughout the device such as, for example, projector 108 or display 110.

In an example, a depth sensor 106 may indicate when a 3D object is on a work surface, such as on mat 112 or, in other examples, a table or other surface suitable for scanning. In particular, depth sensor 106 may sense or detect the presence, shape, contours, motion, and/or the 3D depth of an object, or specific feature(s) of an object. Thus, in some examples, depth sensor 106 may employ any suitable sensor or camera arrangement to sense and detect a 3D object and/or the depth values of each pixel, whether infrared, color, or other, disposed in the sensor's field-of-view. In some examples, depth sensor 106 may comprise a single IR camera sensor with a uniform flood of IR light, a dual IR camera sensor with a uniform flood of IR light, structured light depth sensor technology, time-of-flight (TOF) depth sensor technology, or some combination thereof.

In an example, a user interface sensor 106 may comprise any suitable device or devices (e.g., sensor or camera) for tracking a user input device such as, for example, a hand, stylus, or pointing device.

In various examples, sensor cluster 104 may comprise other sensors and/or cameras either in lieu afar in addition to sensors described above, and/or in different configurations, such as for use with a desktop, tablet, or smartphone.

Sensors 106 in sensor cluster 104, or any sensors accessible by device 100 in general, may be electrically and communicatively coupled to one other and/or device 100 or components of device 100 such that data generated within sensor cluster 104 may be transmitted to device 100, and commands issued by device 100 may be communicated to the sensors 106 through any suitable electrical and/or communicative coupling.

Figure 2:
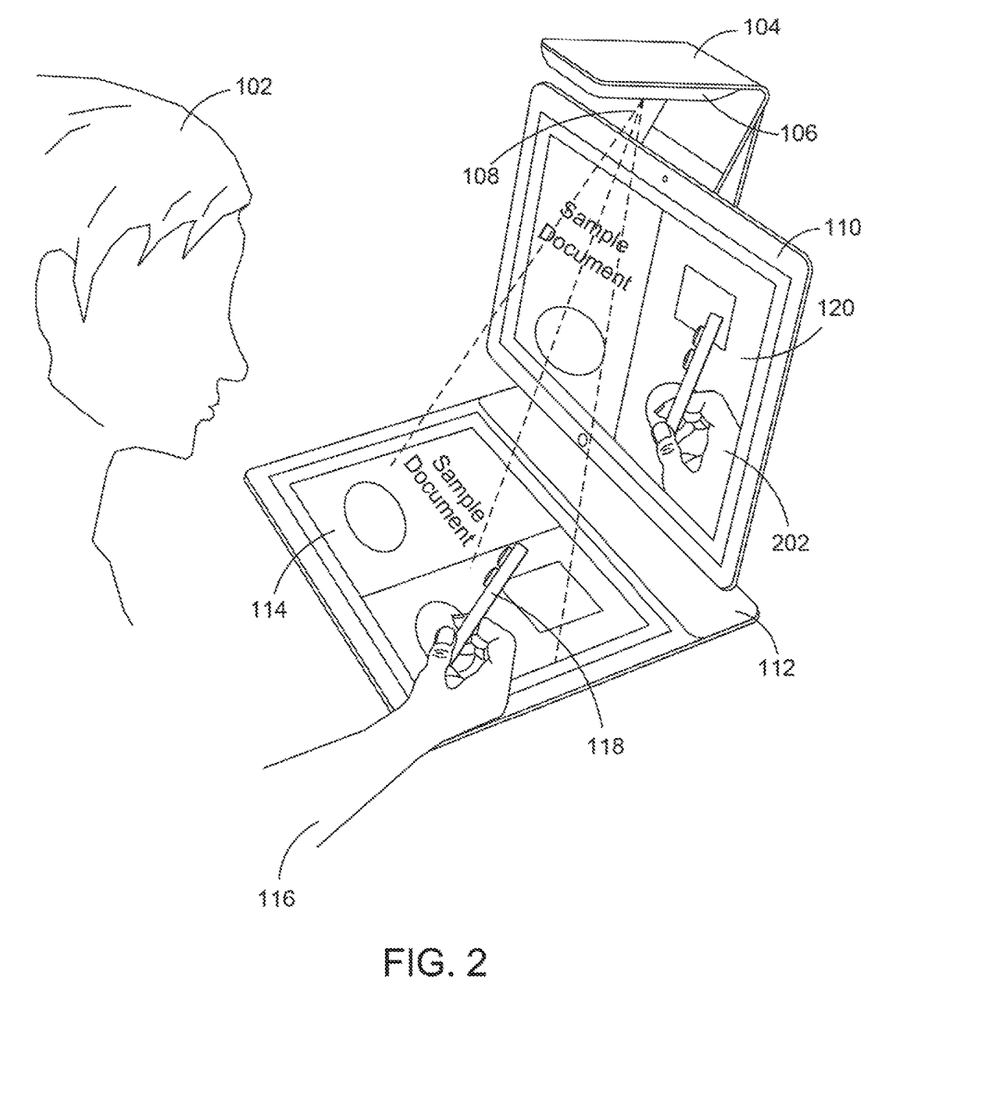
FIG. 2 is a perspective view of a device outputting content and an object in a second position, according to an example of the present disclosure.

FIG. 2 is a perspective view of a device outputting content with an object in a second position, according to an example of the present disclosure. In the example of FIG. 2, as the user's hand 116 has moved, the image projected by projector 108 has changed such that the source content is not projected onto the user's hand as discussed below. Further, the real-time representation 202 of the object 116 being captured or scanned is also updated to reflect a new, clean capture of the object 116 in a new location without source content projected onto the object, e.g., without source content projected onto the user's hand.

Figure 3:
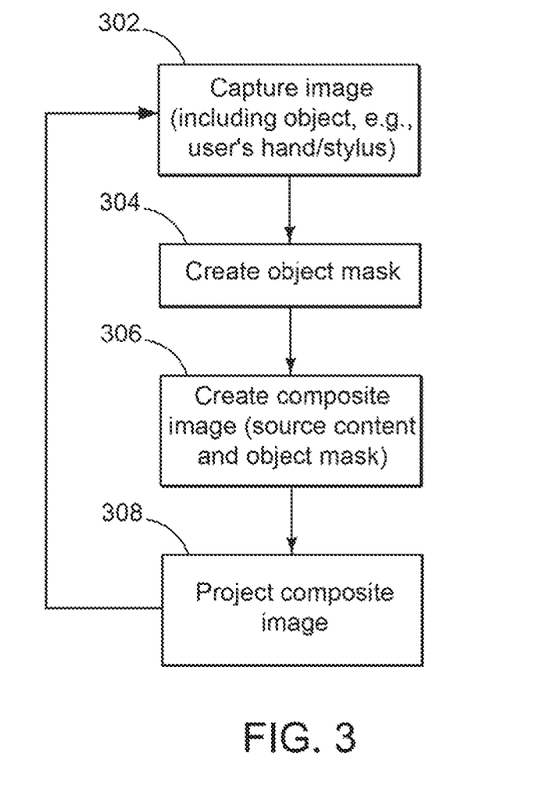
FIG. 3 is a flowchart of projecting a composite image, according to an example of the present disclosure.

FIG. 3 is a flowchart of projecting a composite image, according to an example of the present disclosure.

Figure 5:
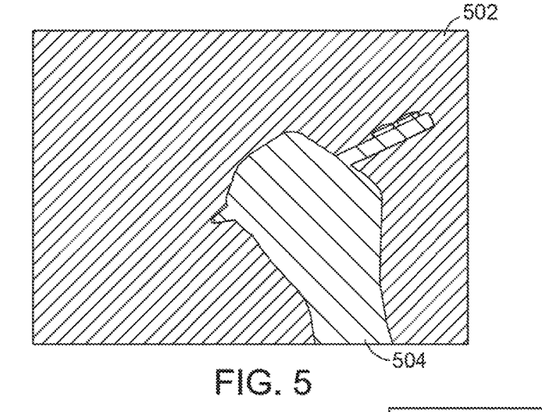
FIG. 5 is an illustration of a captured image by at least one sensor, according to an example of the present disclosure.

In block 302, an image is captured by, e.g., a sensor 106. The captured image may represent the projected source content with an object such as a user's hand or a stylus on or on top of the projected source content, as shown in the example of FIG. 5, e.g., the capture of block 302 may be a capture of "live" image data.

In block 304, an object mask is created, as described below in more detail with respect to FIGS. 4A and 4B. The object mask may represent a colored or uncolored mask area, such as an off-white or gray mask corresponding to the shape and position of the user hand or object 116 such that, when projected, the mask area prevents the source content from being projected onto an object such as a hand. In some examples, exposure changes or light dimming behind an object, e.g., behind the user's hand, may also be used to compensate such that source content is not projected onto an object, e.g., the user's hand.

Figure 6:
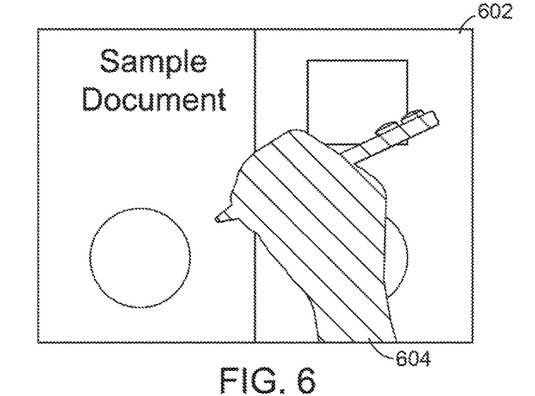
FIG. 6 is an illustration of a source content file and an object mask projected by a device, according to an example of the present disclosure.

In block 306, a composite image is created. In an example, the object mask and the source content are combined, e.g., via compensation or a compositor, to create a first composite image, as shown in the example of FIG. 6.

In the example of block 308, the first composite image is projected, e.g., onto mat 112 or other surface, such that the object mask prevents source content from being projected on the object 116, e.g., a user's hand or stylus.

In some examples, the flow of FIG. 3 may loop. For example, after the first composite image is projected in block 308, the image may be captured or re-captured in block 302 using sensor 106, with a second object mask and second composite image created to project a second composite image to allow for, e.g., movement in an object such as a user's hand or a change in shape or location of the object.

Figure 7:
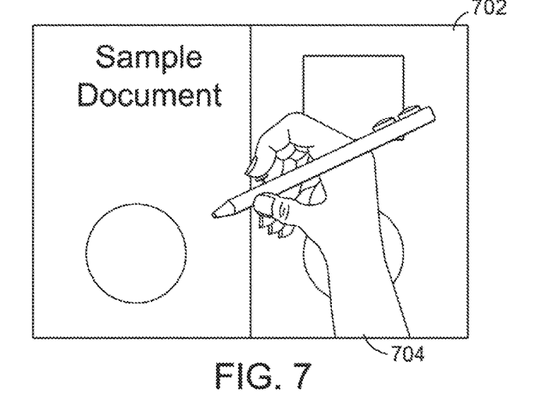
FIG. 7 is an illustration of a source content file and an object displayed by a device, according to an example of the present disclosure.

In some examples, at least one element of the re-captured image such as a user's hand may be displayed on a display, e.g., display 110 as shown in FIG. 7, or otherwise output to, e.g., a digital file, instant messaging, screen sharing, other protocol, or to a printer, as a second (or third, etc.) composite image in combination with the source content. For example, a re-capture of the user's hand without projected content on the hand, i.e., a "clean" capture as discussed with respect to the steps above, may be combined with the original source content for display such as a Powerpoint presentation, as opposed to the lower-quality captured version of that Powerpoint presentation. In such an example, the image quality of both the captured image/object and the original source content will be maximized and/or maintained when displayed as a composite image.

In some examples, multiple objects, e.g., multiple hands, may be captured or re-captured, such that the image output to, e.g., a digital file, contains more than one object, including in collaboration use-cases where users may be remotely located.

Figure 4A:
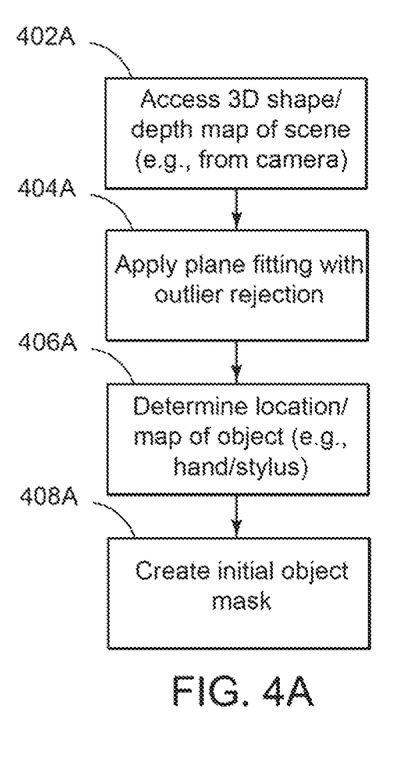
FIG. 4A is a flowchart of creating an initial object mask, according to a first example of the present disclosure.

FIG. 4A is a flowchart of creating an initial object mask, according to a first example of the present disclosure.

In some examples, device 100 may comprise a real-time camera with a 3D shape of the image captured by the camera including at least one object, e.g., the user's hand on, or on top of, the projected source content. In some examples, the surface on which the source content is projected, e.g., mat 112 or other surface, may be known or assumed to be flat, such that a 3D depth map collected by the camera may be used to determine which parts of the capture do not fit the plane, e.g., which parts of the scene represent the object or hand. In some examples, a plane fitting algorithm may be used to determine which parts do not fit the plane, and in some examples, the plane fitting algorithm may reject or exclude outliers.

In block 402A, the 3D shape/depth map or other sensor information is accessed, and in block 404A, in an example, a plane fitting algorithm with outlier rejection is applied to the map.

In block 406A, the location or map of an object or objects within the captured image or scene is determined based on the 3D shape and plane fitting with outlier rejection algorithm. In some examples, other algorithms may be used to determine the location of objects.

In block 408A, an initial object mask is created based on the location/map of the object determined in block 406A. The initial object mask may be used as an input to, e.g., block 306 discussed above to create a composite image of the source content and object mask, or may be used as an input to, e.g., block 802 discussed below if the object mask is to be further refined.

Figure 4B:
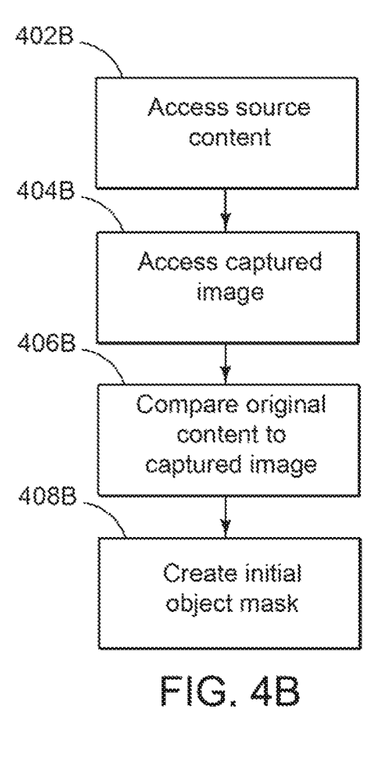
FIG. 4B is a flowchart of creating an initial object mask, according to a second example of the present disclosure.

FIG. 4B is a flowchart of creating an initial object mask, according to a second example of the present disclosure.

In some examples, device 100 may compare the captured image with the source content to determine, e.g., where an object or hand is located based on a difference between the captured image and the source content, e.g., based on a color difference.

In block 402B, in an example, the source content file is accessed, and in block 404B, the captured image is accessed, e.g., as captured by block 302. In block 406B, the source content is compared to the captured image. Various algorithms, such as algorithms related to image change and/or 3D segmentation, may be applied.

In block 408B, an initial object mask is created based on the comparison of the source content to the captured image in block 406B. As discussed above with respect to FIG. 4A, the initial object mask may be used as an input to, e.g., block 306 discussed above to create a composite image of the source content and object mask, or may be used as an input to, e.g., block 802 discussed below if the object mask is to be further refined.

In various examples, the methods of FIGS. 4A and 4B may be used separately or in conjunction to create an initial object mask, or with other algorithms or techniques for creating an image mask.

FIG. 5 is an illustration of a captured image by at least one sensor, according to an example of the present disclosure Sensors 106, e.g., a camera or 3D sensor, may be used to capture an image within the field-of-view of the sensor 106. In some examples, the captured image may represent the projected source content 502, and an object or objects 504 such as the user's hand and/or stylus. The capture of FIG. 5 may be referred to as the capture of a live image, e.g., the projected source content with an object on, or on top of, the projected image.

FIG. 6 is an illustration of a source content file and an object mask projected by a device, according to an example of the present disclosure. In an example, the source content 602 and the object mask 604, discussed above, are combined, e.g., via compensation or a compositor, to create the composite image of FIG. 6. In some examples, as discussed above, the composite image of FIG. 6 may be used to project the source content 602 with compensation for a user's hand to, e.g., prevent the source content 602 from being projected onto the user's hand. In some examples, exposure changes or light dimming behind an object, e.g., behind the user's hand as defined by the object mask, may be used to compensate such that source content is not projected onto an object, e.g., the user's hand.

In some examples, the captured image may be captured by more than one sensor and fused or otherwise combined, and/or the object mask may be created by use of inputs from more than one sensor. For example, as mentioned above with respect to FIG. 1, device 100 may comprise a high-resolution camera, a low-resolution camera, an infrared ("IR") camera, or other camera type, as well as a depth sensor. In some examples, the captured image may be captured by a combination of sensors, and/or the object mask may be created by a combination of inputs from more than one sensor, such as using a combination of depth and IR sensors along with an RGB capture from a high-resolution camera.

FIG. 7 is an illustration of a source content file and an object displayed by a device such as on a monitor or otherwise output, according to an example of the present disclosure.

In the example of FIG. 7, the object 704 has been recaptured by, e.g., a second loop of FIG. 3, such that the captured image includes a clean capture of the object without the source content projected onto the object. More specifically, FIG. 7 illustrates displaying a capture of image data within the field-of-view of a sensor after a first composite image has been projected with an object mask.

Figure 8:
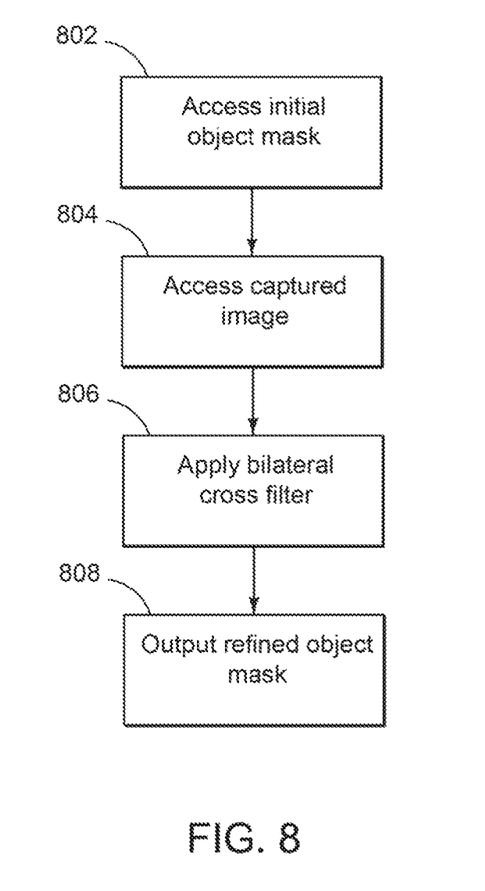
FIG. 8 illustrates a flow diagram of refining an object mask, according to an example of the present disclosure.

FIG. 8 illustrates a flow diagram of refining an object mask, according to an example of the present disclosure.

In some examples, an initial object mask, as discussed below with respect to FIG. 9A, may have coarse or rough edges due to, for example, a capture in block 302 by a low-resolution sensor on device 100, such as a 640×480 sensor. Such sensors may be chosen due to system resources, such as to allow for lower CPU and memory overhead. A refined object mask, as discussed below with respect to FIG. 9B, may be created based on various methods or filters.

In an example, in block 802, an initial object mask, e.g., 904A, is accessed, and in block 804, a captured image is accessed. A filter, e.g., a bilateral cross filter, may be applied in block 806, and a refined object mask, e.g., 904b, may be output in block 808. The refined object mask may be used as input to, e.g., block 306 discussed above.

Figure 9A:
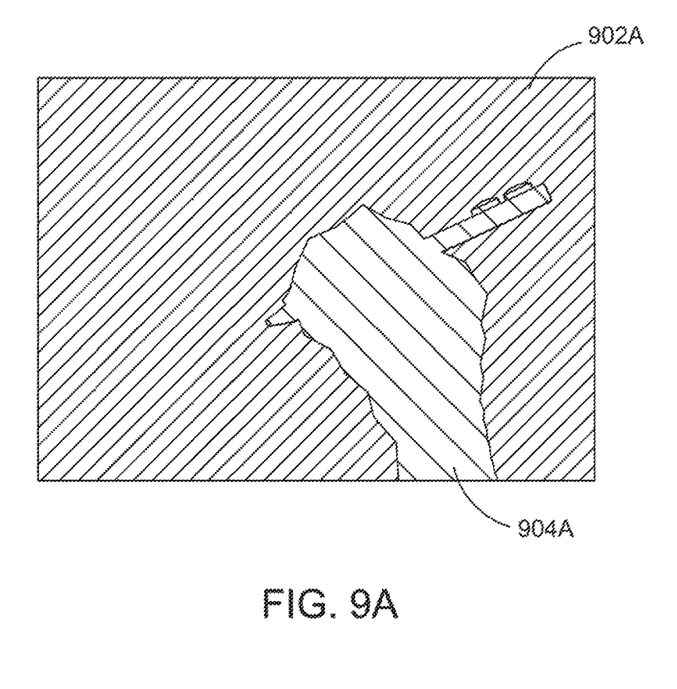
FIGS. 9A and 9B illustrate an original object mask and a refined object mask, according to an example of the present disclosure.
Figure 9B:
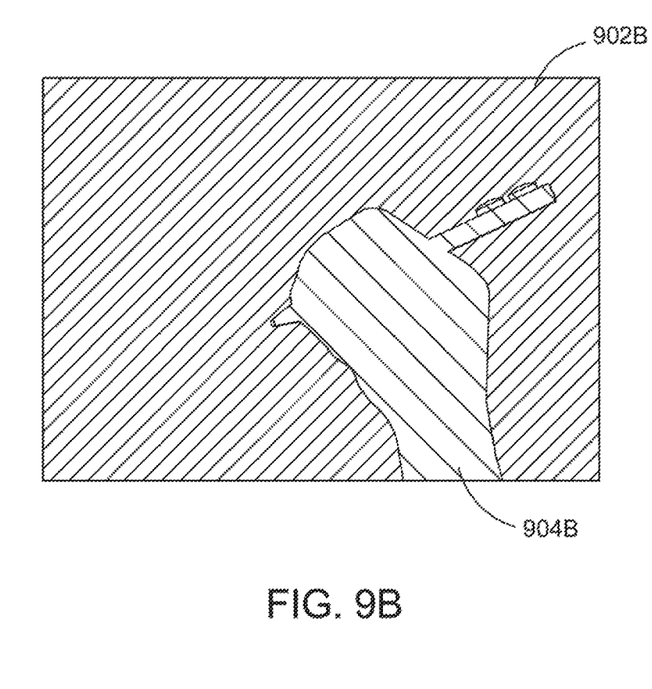

FIGS. 9A and 9B illustrate an original object mask and a refined object mask, according to an example of the present disclosure. As discussed above with respect to FIG. 8, the original object mask of FIG. 9A may have coarse or rough edges due to, for example, a capture in block 302 by a low-resolution sensor on device 100, such as a 640×480 sensor. Also as discussed above, the refined object mask of FIG. 9B may be the result of applying a filter, e.g., a bilateral cross filter, to the original object mask of FIG. 9A.

Figure 10:
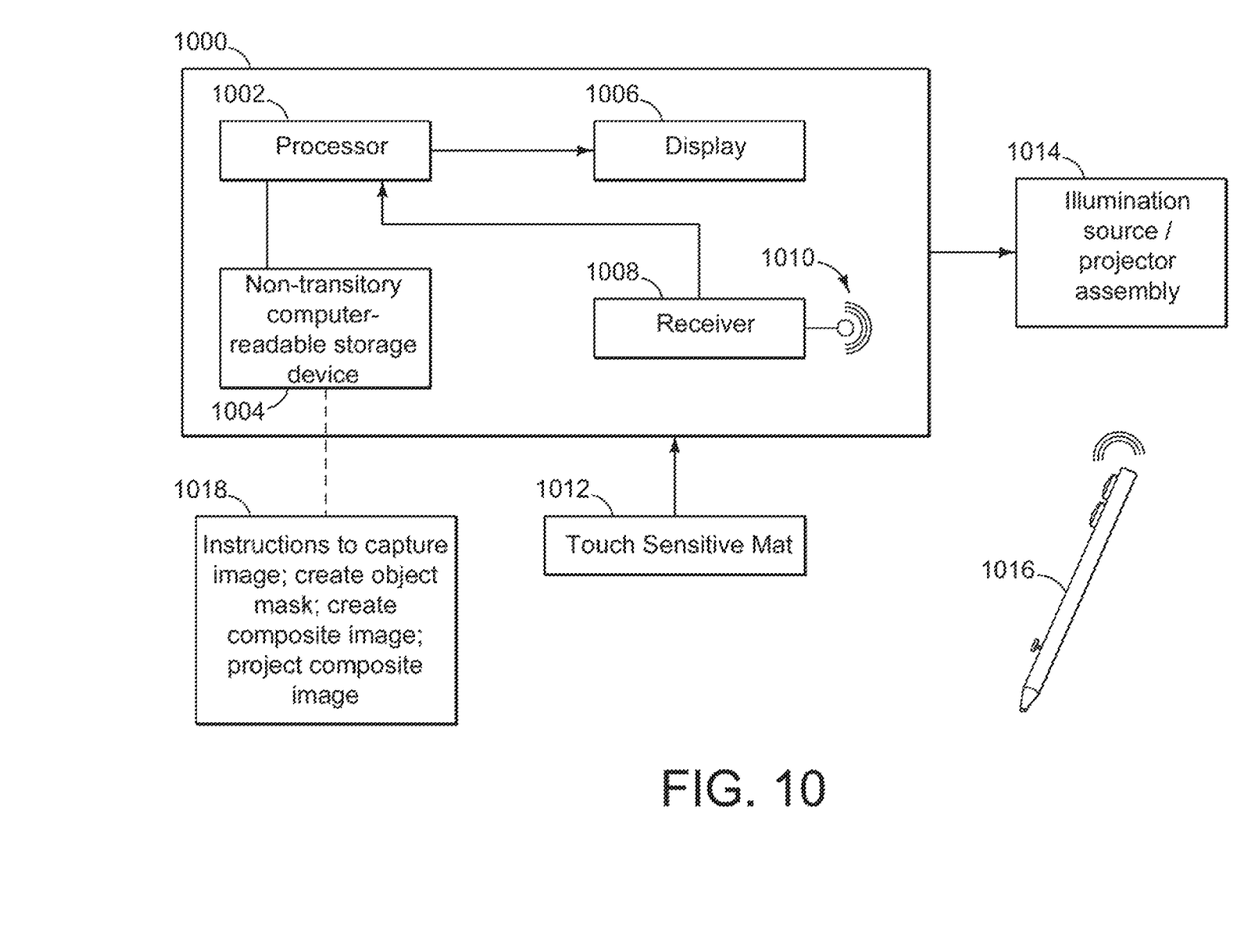
FIG. 10 is a diagram of the device of FIG. 1, according to an example of the present disclosure.

FIG. 10 is a diagram of the device of FIG. 1, according to an example of the present disclosure. Device 100 may comprise a processor 1002, a non-transitory computer-readable storage device or medium 1004, a display or display adapter 1006, and a receiver 1008. Device 100 may be coupled to a mat 1012, an illumination source/projector assembly 1014, and a pointer device or stylus 1016. Non-transitory computer-readable storage device or medium 1004 may comprise instructions to execute the steps described herein, such as the instructions of blocks 302 to 308 in FIG. 3.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of outputting image data, comprising:
    capturing, on a sensor, an image comprising at least a surface and an object;
    creating, on a processor, an object mask based on the captured image;
    creating, on the processor, a first composite image based on the object mask and a source content file;
    projecting, on a projector, the first composite image to the surface to form a projected first composite image;
    capturing, on the sensor, an image of the object from the projected first composite image; and
    combining the captured image of the object with content from the source content file to provide a second composite image.

2. The method according to claim 1, wherein an intensity of the first composite image is adjusted to a different value in an area corresponding to the object mask.

3. The method according to claim 1, further comprising capturing a third image, creating a second object mask and a third composite image, and projecting the third composite image.

4. The method according to claim 1, wherein the object mask is created by applying a plane fitting algorithm.

5. The method according to claim 1, wherein the object mask is created by comparing the captured image to the source content file.

6. The method of claim 1, further comprising:
    generating a digital file comprising data representing the second composite image.

7. A system for outputting image data, comprising:
    a camera attachable to a support structure to capture an image projected onto a surface and an object;
    a projector attachable to the support structure; and
    a processor communicatively coupled to the camera and the projector,
    wherein the processor is to create an object mask based on the captured image and data associated with the captured object and create a first composite image of the object mask and a source content file,
    wherein the projector is to project the first composite image to the surface to form a projected first composite image,
    wherein the camera is to capture an image of the object from the projected first composite image, and
    wherein the processor is to combine the image of the object with content from the source content file to provide a second composite image.

8. The system according to claim 7, wherein the projector comprises an adjustable intensity setting.

9. The system according to claim 8, wherein the adjustable intensity setting is adjusted based on the object mask.

10. The system according to claim 7, wherein the processor is to create an object mask by executing a plane fitting algorithm.

11. The system according to claim 7, wherein the processor is to create an object mask by comparing the captured image to the source content file.

12. The system of claim 7, further comprising:
    a display to display the second composite image.

13. The system of claim 7, wherein the processor generates a digital file comprising data representing the second composite image.

14. A non-transitory computer readable storage medium on which is embedded a computer program, said computer program to output image data, said computer program comprising a set of instructions to:
    capture, on a sensor, a first image projected onto a surface and an object;
    create, on a processor, an object mask based on the captured image and the captured object and a first composite image based on the object mask and a source content file of the captured image;
    project, on a projector, the first composite image to the surface to form a projected first composite image;
    capture, on the sensor, an image of the object from the projected first composite image; and
    combine the image of the object with content from the source content file to provide a second composite image.

15. The computer readable storage medium according to claim 14, wherein the second composite image is output to a display.

16. The computer readable storage medium according to claim 14, wherein the second composite image is output to a digital file.

17. The method of claim 1, further comprising displaying the second composite image.

* * * * *